(12) United States Patent
Yang

(10) Patent No.: US 8,923,399 B2
(45) Date of Patent: Dec. 30, 2014

(54) METHOD AND AN APPARATUS FOR PROCESSING A VIDEO SIGNAL

(75) Inventor: Jeong Hyu Yang, Seoul (KR)

(73) Assignee: LG Electronics Inc. (KR)

( * ) Notice: Subject to any disclaimer, the term of this patent is extended or adjusted under 35 U.S.C. 154(b) by 1330 days.

(21) Appl. No.: 12/449,062

(22) PCT Filed: Jan. 24, 2008

(86) PCT No.: PCT/KR2008/000444
§ 371 (c)(1),
(2), (4) Date: Oct. 9, 2009

(87) PCT Pub. No.: WO2008/091117
PCT Pub. Date: Jul. 31, 2008

(65) Prior Publication Data
US 2010/0091858 A1 Apr. 15, 2010

Related U.S. Application Data

(66) Substitute for application No. 60/947,979, filed on Jul. 4, 2007.

(60) Provisional application No. 60/886,350, filed on Jan. 24, 2007, provisional application No. 60/909,582, filed on Apr. 2, 2007, provisional application No. 60/907,964, filed on Apr. 25, 2007, provisional application No. 60/924,693, filed on May 29, 2007.

(51) Int. Cl.
| | |
|---|---|
| *H04N 11/02* | (2006.01) |
| *H04N 7/12* | (2006.01) |
| *H04N 19/137* | (2014.01) |
| *H04N 19/107* | (2014.01) |
| *H04N 19/527* | (2014.01) |
| *H04N 19/597* | (2014.01) |
| *H04N 19/176* | (2014.01) |
| *H04N 19/61* | (2014.01) |

(52) U.S. Cl.
CPC ... *H04N 19/00593* (2013.01); *H04N 19/00145* (2013.01); *H04N 19/0003* (2013.01); *H04N 19/00769* (2013.01); *H04N 19/00278* (2013.01); *H04N 19/00781* (2013.01)

USPC .................................. 375/240.13; 375/240.16

(58) Field of Classification Search
CPC ................... H04N 19/00769; H04N 19/00593
USPC ............. 375/240.12, 240.13, 240.16, 240.24; 348/218.1; 380/200
IPC .......................................................... H04N 7/13
See application file for complete search history.

(56) References Cited

U.S. PATENT DOCUMENTS

| | | | |
|---|---|---|---|
| 7,936,821 B2 * | 5/2011 | Suzuki ..................... | 375/240.16 |
| 2004/0141615 A1 * | 7/2004 | Chujoh et al. ................ | 380/200 |

(Continued)

FOREIGN PATENT DOCUMENTS

| | | |
|---|---|---|
| JP | 2005-110113 | 4/2005 |
| JP | 2010-516158 | 5/2010 |

OTHER PUBLICATIONS

European Search Report dated Feb. 8, 2010 for corresponding Application No. 08704944.1.

(Continued)

*Primary Examiner* — Jessica M Prince
*Assistant Examiner* — Richard Carter
(74) *Attorney, Agent, or Firm* — Harness, Dickey & Pierce, PLC

(57) ABSTRACT

An apparatus for processing a video signal and method thereof are disclosed, by which the video signal from which redundancy of inter-view pictures is eliminated can be decoded. The present invention includes obtaining a block type of a first corresponding block within a first reference view included in a reference list, if the block type of the first corresponding block is an intra block, obtaining a block type and motion information of a second corresponding block within a second reference view included in the reference list, and if the block type of the first corresponding block is not the intra block, decoding a current block using the motion information of the second corresponding block.

6 Claims, 13 Drawing Sheets

(56) References Cited

U.S. PATENT DOCUMENTS

| | | | |
|---|---|---|---|
| 2004/0247159 | A1 | 12/2004 | Damera-Venkata et al. |
| 2006/0132610 | A1 | 6/2006 | Xin et al. |
| 2006/0146143 | A1 | 7/2006 | Xin et al. |
| 2006/0233251 | A1* | 10/2006 | Kim et al. ............... 375/240.12 |
| 2006/0262856 | A1 | 11/2006 | Wu et al. |
| 2007/0071107 | A1* | 3/2007 | Ha ........................... 375/240.24 |
| 2007/0177813 | A1 | 8/2007 | Yang |
| 2012/0062756 | A1* | 3/2012 | Tian et al. ................. 348/218.1 |

OTHER PUBLICATIONS

H-S Koo et al: "CE11: MVC motion skip mode" Joint Video Team (JVT) of ISO/IEC MPEG & ITU-T VCEG (ISO/IEC JTC1/SC29/WG11 and ITU-T SG16 Q6), No. JVT-V069, Jan. 10, 2007, XP030006877.

Meeting report of the 22nd JVT meeting (Draft 6/7) Joint Video Team (JVT) of ISO/IEC MPEG & ITU-T VCEG (ISO/IEC JTC1/SC29/WG11 and ITU-T SG16 Q6), No. JVT-V200, Jan. 19, 2007, XP007911202.

Vetro A et al: "Joint Multiview Video Model (JMVM) 1.0" Joint Video Team (JVT) of ISO/IEC MPEG & ITU-T VCEG, Klagenfurt, Austria, vol. JVT-T208, Jul. 15, 2006, pp. 1-23, XP002485056.

H-S Koo et al: "MVC motion from neighbor view" Joint Video Team (JVT) of ISO/IEC MPEG & ITU-T VCEG (ISO/IEC JTC1/SC29/WG11 and ITU-T SG16 Q6), No. JVT-U091, Oct. 22, 2006, XP030006737.

Koo H S et al: "MVC motion skip mode" Joint Video Team (JVT) of ISO/IEC MPEG & ITU-T VCEG (ISO/IEC JTC1/SC29/WG11 and ITU-T SG16 Q6), No. JVT-W081, Apr. 19, 2007, XP030007041.

European Office Action dated Apr. 12, 2011 for corresponding European Application No. 08704944.1.

Song H S et al: "MVC skip mode", ITU Study Group 16—Video Coding Experts Group—ISO/IEC MPEG & ITU-T VCEG (ISO/IEC JTC1/SC29/WG11 and ITU-T SG16 Q6), XX, XX, No. JVT-V052, Jan. 16, 2007, XP030006860.

Yang H et al: "CE1: Fine motion matching for motion skip mode in MVC", 26. JVT Meeting; 83. MPEG Meeting; Jan. 13-18, 2008; Antalya; (Joint Video Team of ISO/IEC JTC1/SC29/WG11 and ITU-T SG. 16), No. JVT-Z021, Jan. 14, 2008, XP030007310.

Han-Suh Koo, et al. "Motion Skip Mode for MVC"; Joint Video Team (JVT) of ISO/IEC MPEG & ITU-T VCEG (ISO/IEC JTC1/SC29/WG11 and ITU-T SG16 Q6), 21th Meeting: Hangzhou, China Oct. 2006, JVT-U091.

Hak-Sup Song et al. "Macroblock Information Skip for MVC", Joint Video Team (JVT) of ISO/IEC MPEG & ITU-T VCEG (ISO/IEC JTC1/SC29/WG11 and ITU-T SG16 Q6), 22nd Meeting, Marrakech, Morocco, Jan. 2007, JVT V-052.

* cited by examiner

METHOD AND AN APPARATUS FOR PROCESSING A VIDEO SIGNAL

This application is a National Phase entry of PCT Application No. PCT/KR2008/000444, filed on Jan. 24, 2008, which claims priority under 35 U.S.C. §119(e), 120 and 365 (c) to U.S. Provisional Application No. 60/886,350, filed on Jan. 24, 2007, U.S. Provisional Application No. 60/909,582, filed on Apr. 2, 2007, U.S. Provisional Application No. 60/907,964, filed on Apr. 25, 2007, U.S. Provisional Application No. 60/924,693, filed on May. 29, 2007, and U.S. Provisional Application No. 60/947,979, filed on Jul. 4, 2007 in the U.S. Patent and Trademark Office, the contents of each of which are incorporated by reference in its entirety.

TECHNICAL FIELD

The present invention relates to video signal processing, and more particularly, to a method for processing a video signal and apparatus thereof. Although the present invention is suitable for a wide scope of applications, it is particularly suitable for decoding video signals.

BACKGROUND ART

Generally, compression coding means a series of signal processing techniques for transferring digitalized information via a communication circuit or storing digitalized information in a format suitable for a storage medium. Targets of compression coding include audio, video, character, etc. In particular, a technique of performing compression coding on video is called video compression. Video sequence is generally characterized in having spatial redundancy and temporal redundancy.

DISCLOSURE OF THE INVENTION

Technical Problem

However, if the spatial redundancy and the temporal redundancy are not sufficiently eliminated, a compression rate in coding a video signal is lowered. If the spatial redundancy and the temporal redundancy are excessively eliminated, it is unable to generate information required for decoding a video signal to degrade a reconstruction ratio.

Specifically, in a multi-view video signal, since inter-view pictures mostly have the difference caused by a camera position only, they tend to have very high relevance and redundancy. In case that the redundancy of the inter-view pictures is insufficiently eliminated, a compression ratio or a reconstruction rate is lowered.

Technical Solution

Accordingly, the present invention is directed to a method for processing a video signal and apparatus thereof that substantially obviate one or more of the problems due to limitations and disadvantages of the related art.

An object of the present invention is to provide a method for processing a video signal and apparatus thereof, by which the video signal from which redundancy of inter-view pictures is eliminated can be decoded.

Another object of the present invention is to provide a method for processing a video signal and apparatus thereof, by which motion compensation can be carried out in a manner of obtaining motion information on a current picture based on relevance between inter-view pictures.

A further object of the present invention is to provide a method for processing a video signal and apparatus thereof, by which a reconstruction rate of a current picture can be raised using motion information in a reference view having high similarity to motion information on the current picture.

Advantageous Effects

Accordingly, the present invention provides the following effects or advantages.

First of all, the present invention omits motion information having high redundancy in encoding a video signal, thereby raising a compression ratio.

Secondly, in decoding a video signal, even if motion information on a current picture is not transferred, the present invention raises a reconstruction rate of the video signal using motion information of a reference view having considerable similarity to motion information on the current picture.

Thirdly, in decoding a video signal, in case that motion information fails to exist in a picture of a neighbor view, the present invention uses motion information existing in a picture of another view.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE

Figure 1:
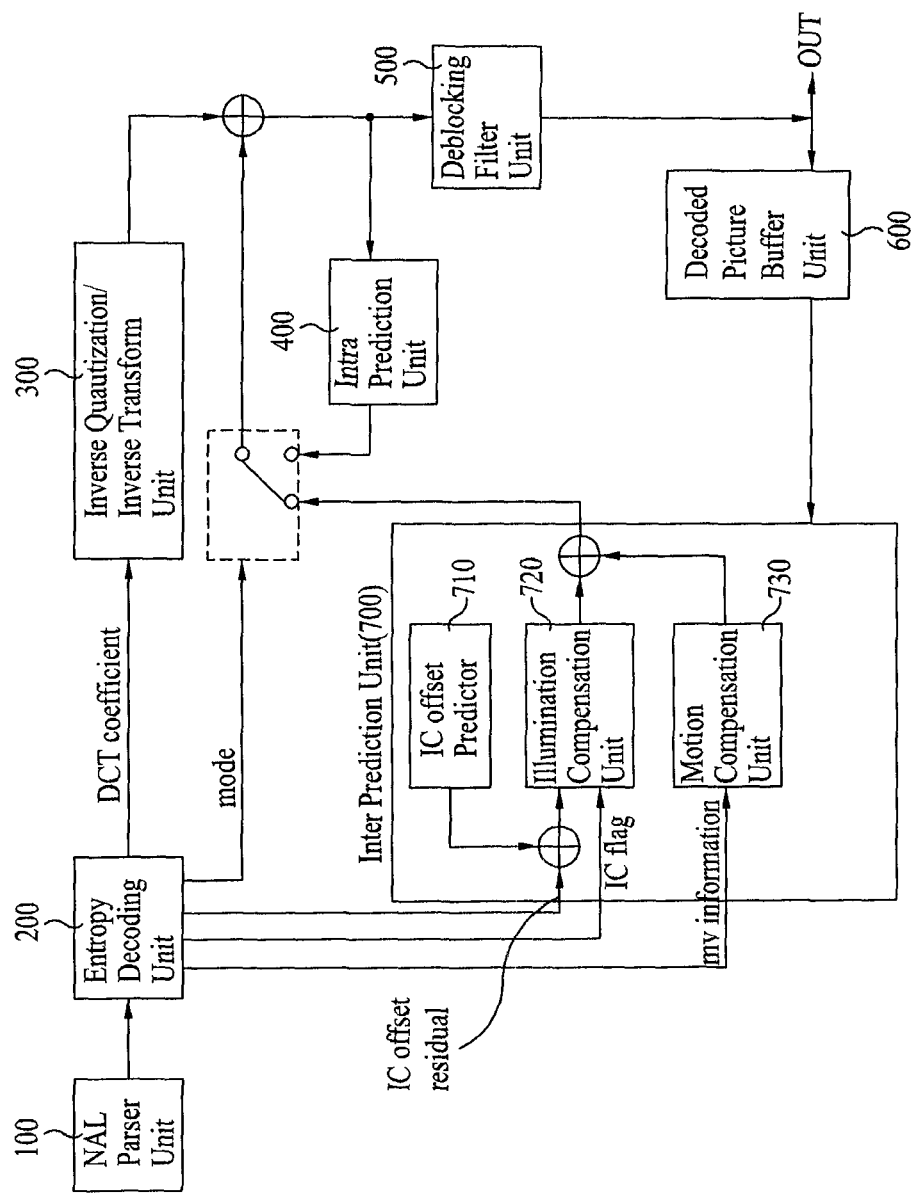
FIG. 1 is a schematic block diagram of a video signal decoding apparatus according to the present invention.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of processing a video signal according to the present invention includes obtaining a block type of a first corresponding block within a first reference view included in a reference list, if the block type of the first corresponding block is an intra block, obtaining a block type and motion information of a second corresponding block within a second reference view included in the reference list, and if the block type of the first corresponding block is not the intra block, decoding a current block using the motion information of the second corresponding block.

Preferably, the reference list includes a first reference list and a second reference list.

More preferably, the first reference list includes a forward reference view and the second reference list includes a backward reference view.

Preferably, the reference list is obtained based on view dependency on a current view.

Preferably, the first reference view corresponds to a reference view having a lowest index indicating an order of being included in a bitstream of the video signal among reference views included in the reference list.

Preferably, the first reference view corresponds to a reference view closest to a current view among reference views included in the reference list.

Preferably, the first corresponding block is obtained based on a global motion vector for the first reference view.

Preferably, the first corresponding block belongs to a reference view within a first reference list of the reference list and the second corresponding block belongs to a reference view within a second reference list of the reference list.

Preferably, the second corresponding block is obtained based on a global motion vector for the second reference view.

Preferably, the motion information includes a motion vector and a reference picture index.

More preferably, the decoding further includes obtaining a reference picture in an intra-view direction.

Preferably, the video signal is received on a broadcast signal.

Preferably, the video signal is received via a digital medium.

To further achieve these and other advantages and in accordance with the purpose of the present invention, a computer-readable recording medium comprising a program for executing a method including obtaining a block type of a first corresponding block within a first reference view included in a reference list, if the block type of the first corresponding block is an intra block, obtaining a block type and motion information of a second corresponding block within a second reference view included in the reference list, and if the block type of the first corresponding block is not the intra block, decoding a current block using the motion information of the second corresponding block.

To further achieve these and other advantages and in accordance with the purpose of the present invention, an apparatus for processing a video signal includes a motion information obtaining unit obtaining a block type of a first corresponding block within a first reference view included in a reference list, the motion information obtaining unit, if the block type of the first corresponding block is an intra block, the motion information obtaining unit obtaining a block type and motion information of a second corresponding block within a second reference view included in the reference list and a decoding unit, if the block type of the first corresponding block is not the intra block, the decoding unit decoding a current block using the motion information of the second corresponding block.

To further achieve these and other advantages and in accordance with the purpose of the present invention, a method of processing a video signal includes reordering at least one of a first reference list and a second reference list, deciding a motion vector using either a first motion information extracted from a bitstream or a second motion information of a corresponding block on a reference view, deciding a motion vector using at least one motion information of inter-motion information extracted from the bitstream and intra-motion information extracted from the corresponding block on the reference view, obtaining a reference block using the motion vector, and decoding a current block of a current picture using the reference block.

Preferably, if the current picture is an anchor picture, the motion vector uses the inter-motion formation only.

More preferably, the reference block is associated with the inter-motion information and the reference block exists on a same time of the current block in a view different from that of the current block.

To further achieve these and other advantages and in accordance with the purpose of the present invention, an apparatus for processing a video signal includes a motion information obtaining unit reordering at least one of a first reference list and a second reference list, the motion information obtaining unit deciding a motion vector using either a first motion information extracted from a bitstream or a second motion information of a corresponding block on a reference view, the motion information obtaining unit deciding a motion vector using at least one motion information of inter-motion information extracted from the bitstream and intra-motion information extracted from the corresponding block on the reference view and a decoding unit obtaining a reference block using the motion vector, the decoding unit decoding a current block of a current picture using the reference block.

It is to be understood that both the foregoing general description and the following detailed description are exemplary and explanatory and are intended to provide further explanation of the invention as claimed.

Mode for Invention

Reference will now be made in detail to the preferred embodiments of the present invention, examples of which are illustrated in the accompanying drawings.

First of all, motion information in the present invention should be construed as a concept that includes interview motion information as well as temporal motion information. Furthermore, a motion vector should be construed as a concept that includes interview disparity offset as well as temporal motion offset.

In the present invention, it is understood that coding should conceptionally include both encoding and decoding.

Meanwhile, intra-view prediction means prediction between pictures existing within a same view and includes temporal prediction for example. Inter-view prediction means prediction between pictures existing in different views.

FIG. 1 is a schematic block diagram of an apparatus for decoding a video signal according to the present invention. Referring to FIG. 1, a decoding apparatus includes a NAL parser unit 100, an entropy decoding unit 200, an inverse quantization/inverse transform unit 300, an intra prediction unit 400, a deblocking filter unit 500, a decoded picture buffer unit 600 and an inter prediction unit 700. And, the inter prediction unit 700 includes an illumination (IC) offset predictor 710, an illumination compensation unit 720 and a motion compensation unit 730.

The NAL parser unit 100 performs parsing by a unit of NAL (network abstraction layer) to decode a received video sequence. Normally, before a slice header and slice data are decoded, at least one sequence parameter set and picture parameter set are transferred to a decoder. In this case, a NAL header unit or an extension unit of a NAL header can contain various kinds of attribute informations. MVC is a scheme additional to AVC scheme. And, it may be more advantageous to add various kinds of attribute informations for a case of an MVC bitstream only rather than to add them unconditionally. For instance, it is able to add flag information for identifying whether it is an MVC bitstream in the NAL header unit or the extension unit of the NAL header. Only if a bitstream inputted in accordance with the flag information is a multi-view sequence coded bitstream, it is able to add attribute informations on a multi-view sequence. For instance; the attribute information can include temporal level information, view level information, inter-view picture group identification information, view identification information and the like.

Parsed bitstream is entropy-decoded by the entropy decoding unit 20, and a coefficient, motion vector and the like of each macroblock is extracted. The inverse dequantization/transform unit 300 obtains a coefficient value transformed by multiplying a received quantized value by a predetermined constant and then reconstructs a pixel value by inverting the coefficient value. The intra prediction unit 400 performs intra-frame prediction from a decoded sample within a current picture using the reconstructed pixel value. Meanwhile, the deblocking filter unit 500 is applied to each coded macroblock to decrease block distortion. In this case, a filter smoothens edges of a block to enhance an image quality of a decoded picture. And, a selection of this filtering process depends on boundary strength and a gradient of an image sample around a boundary. Filtered pictures are outputted or and stored in the decoded picture buffer unit 600 to be used as reference pictures.

The decoded picture buffer unit 600 plays a role in storing or opening previously coded pictures to perform inter-frame prediction. In doing so, to store/open the pictures in/from the decoded picture buffer unit 600, 'frame_num' of each picture and POC (picture order count) are used. In MVC, since there exist pictures in a view different from that of a current picture among the previously coded pictures, view information for identifying a view of picture is usable as well as the 'frame_num' and the POC to utilize theses pictures as reference pictures. The reference pictures managed in the above manner are usable for the inter prediction unit 700 as well.

The inter prediction unit 700 carries out inter-frame prediction using the reference pictures stored in the decoded picture buffer unit 600. It is able to divide inter-coded macroblock into macroblock partitions. And, each of the macroblock partitions can be predicted from one or two reference pictures. The inter prediction unit 700 includes the illumination offset predictor 710, the illumination compensation unit 720 and the motion compensation unit 730.

In case that an inputted bitstream corresponds to a multi-view sequence, each view sequence is a sequence captured by a different camera. So, an illumination difference is generated due to internal and external causes of the cameras. To prevent the illumination difference, the illumination compensation unit 720 carries out illumination compensation. In carrying out the illumination compensation, it is able to use flag information indicating whether to perform illumination compensation on a predetermined layer of a video signal. For instance, it is able to perform illumination compensation using flag information indicating whether to perform illumination compensation on a corresponding slice or macroblock. In performing illumination compensation using the flag information, the illumination compensation is applicable to various macroblock types (e.g., inter 16×16 mode, B-skip mode, direct mode).

The motion compensation unit 730 compensates for a motion of a current block using motion informations transferred from the entropy decoding unit 200. The motion compensation unit 730 extracts motion vectors of blocks neighbor to a current block from a video signal and then obtains a motion vector prediction value of the current block. The motion compensation unit 730 compensates for a motion of the current block using the obtained motion vector prediction value and an offset vector extracted from the video signal. Such motion compensation can be performed using a single reference picture or a plurality of pictures. In multi-view video coding, in case that a current picture refers to pictures in a view different from that of the current picture, motion compensation can be carried out using information on a reference picture list for inter-view prediction which is stored in the decoded picture buffer unit 600. And, motion compensation can be also carried out using view information for identifying a view of a corresponding picture.

Meanwhile, since motion information is needed to carry out the motion compensation in the above manner, motion information corresponding to a specific block may not be transferred. For this, there exists a scheme called a motion skip mode. In particular, the motion skip mode is a scheme for deriving motion information on a current block from motion information on a block having been fully decoded. For instance, a reference picture index, a motion vector and the like of a current block can be derived from a corresponding block existing in a reference view having motion information similar to that of the current block. In this scheme, since the motion information on the current block is not transferred, it is able to save the number of bits necessary to encode motion information.

Current picture is then reconstructed in a manner that the pictures inter-predicted or intra-predicted through the above process are selected in accordance with a prediction mode. Various embodiments of the motion skip mode are explained as follows.

Figure 2:
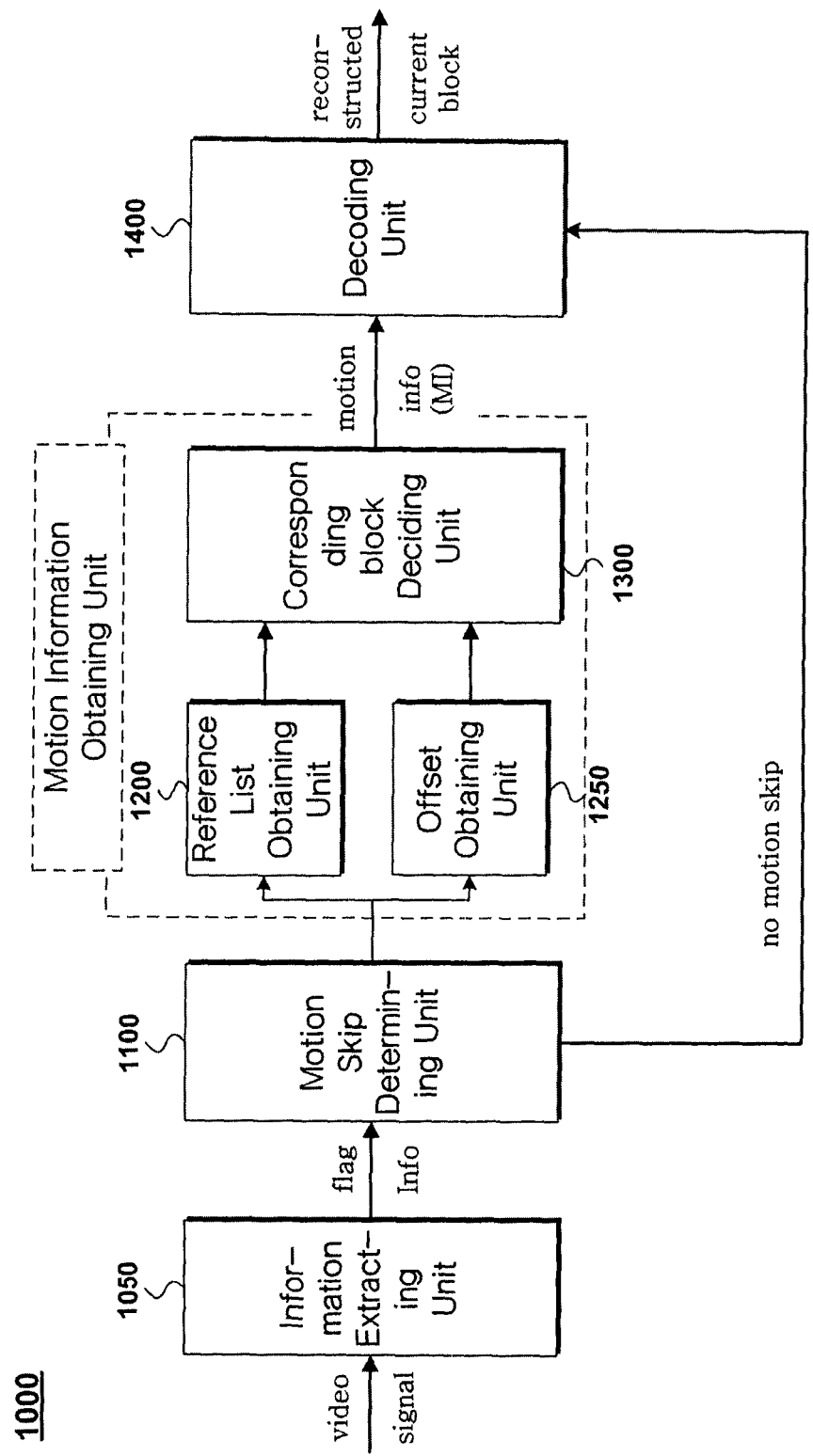
FIG. 2 is a block diagram of a video signal processing apparatus according to an embodiment of the present invention.
Figure 3:
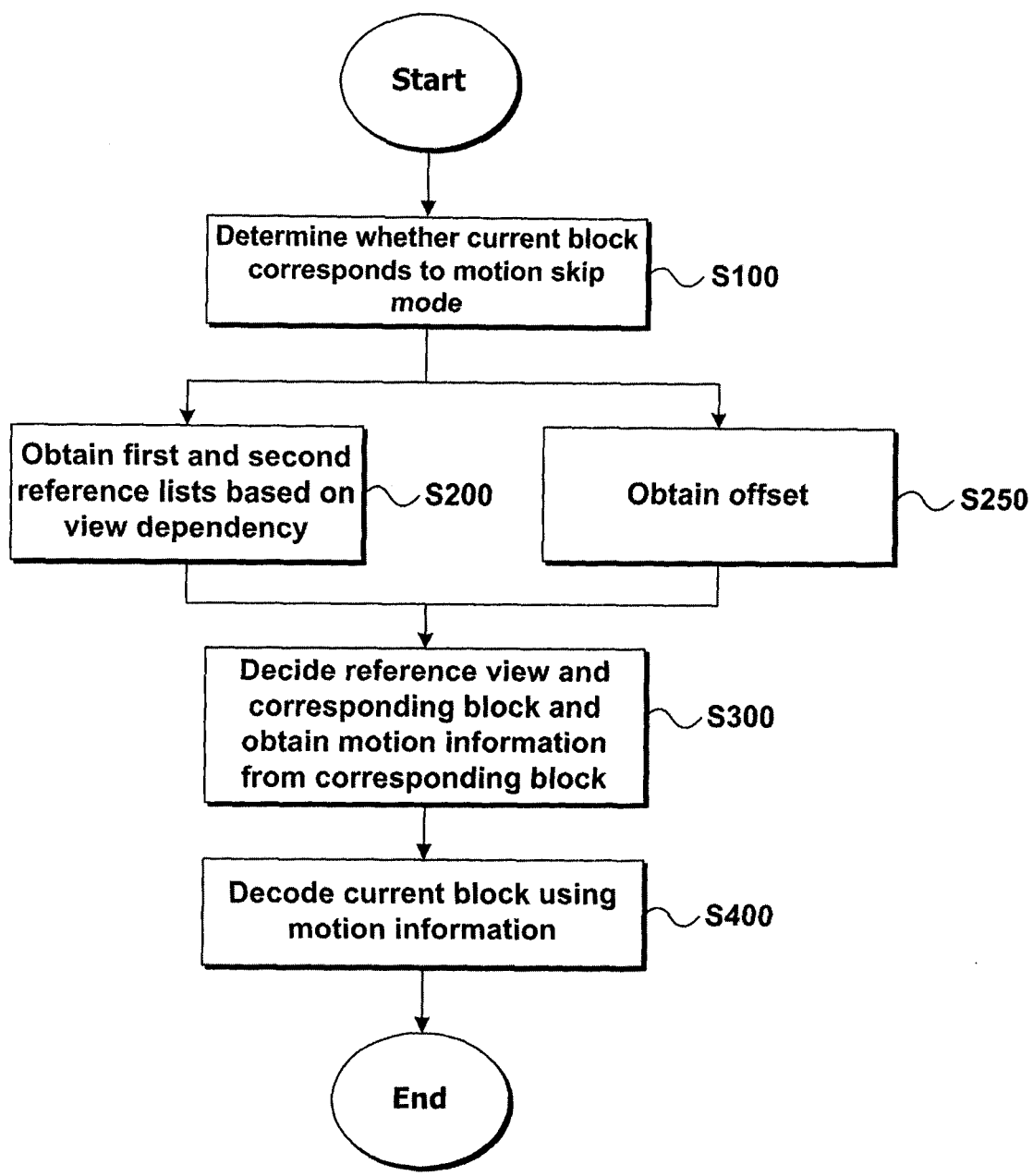
FIG. 3 is a flowchart of a video signal processing method according to an embodiment of the present invention.

FIG. 2 is a block diagram of a video signal processing apparatus according to an embodiment of the present invention, and FIG. 3 is a flowchart of a video signal processing method according to an embodiment of the present invention. Referring to FIG. 2, a video signal processing apparatus 1000 according to an embodiment of the present invention includes an information extracting unit 1050, a motion skip determining unit 1100, a reference list obtaining unit 1200, a offset obtaining unit 1250, a corresponding block deciding unit 1300, and a decoding unit 1400. And, a motion information obtaining unit is able to include the reference list obtaining unit 1200, the offset obtaining unit 1250 and the corresponding block deciding unit 1300. In the following description, the embodiment of the present invention is schematically explained with reference to FIG. 2 and FIG. 3.

First of all, the information extracting unit 1050 extracts motion skip allowing flag information and motion skip applying flag information, and the motion skip determining unit 110 then decides whether a current block corresponds to a motion skip mode based on the extracted information [S110]. If the current block does not correspond to the motion skip mode, the current block is coded using the motion information extracted by the decoding unit 1400 through a step of extracting motion information on the current block from a bitstream. Meanwhile, the information extracting unit 1050 can be included in the entropy decoding unit 200 described with reference to FIG. 1, which does not put limitation on various implementations of the present invention. Besides, the step S110 will be explained in detail later with reference to '1. Motion skip determining step'.

The reference list obtaining unit 1200 obtains a first reference list and a second reference list based on view dependency [S200]. Details of the view dependency and the reference list will be explained later with reference to '2.1 Reference list obtaining step'.

The offset obtaining unit 1250 obtains offset (e.g., global motion vector, local motion vector, zero vector) necessary to search for a corresponding block [S250]. In this case, various embodiments for an offset type and an offset deriving method will be explained in detail later with reference to '2.2 Offset obtaining step'.

The corresponding block deciding unit 1300 decides a reference view and a corresponding block based on the reference list obtained in the step S200 and the offset obtained in the step S250 [S300]. In this process, various embodiments about which one of at lest one reference views having view dependency on a current view will be preferentially searched, which view will be searched in a second-best way if motion information does not exist in a corresponding block of the searched view, and the like will be explained later with reference to '3. Reference view and corresponding block deciding step'. Meanwhile, a method of deciding a corresponding block in accordance with whether a corresponding block corresponds to a macroblock level or 8×8 block level can be diversified, which will be explained later.

The decoding unit 1400 decodes a current block using the motion information on the corresponding block which is decided in the step S300 [S400]. And, residual information can be used as well as the motion information on the corresponding block, of which details will be explained later with reference to '4. Step of decoding a current block using motion information on corresponding block'. Meanwhile, the motion skip determining unit, the reference list obtaining unit 1200, the offset obtaining unit 1250, the corresponding block deciding unit 1300 and the decoding unit 1400 can be included in the motion compensation unit 730 described with reference to FIG. 1, which does not restrict various implementations of the present invention.

1. Motion Skip Determining Step

In the step S100, the information extracting unit 1050 extracts motion skip allowing flag information and motion skip applying flag information, and the motion skip determining unit 1100 decides whether a current block corresponds to a motion skip mode based on the extracted information. Substeps of the step s100 are shown in FIG. 4.

Figure 4:
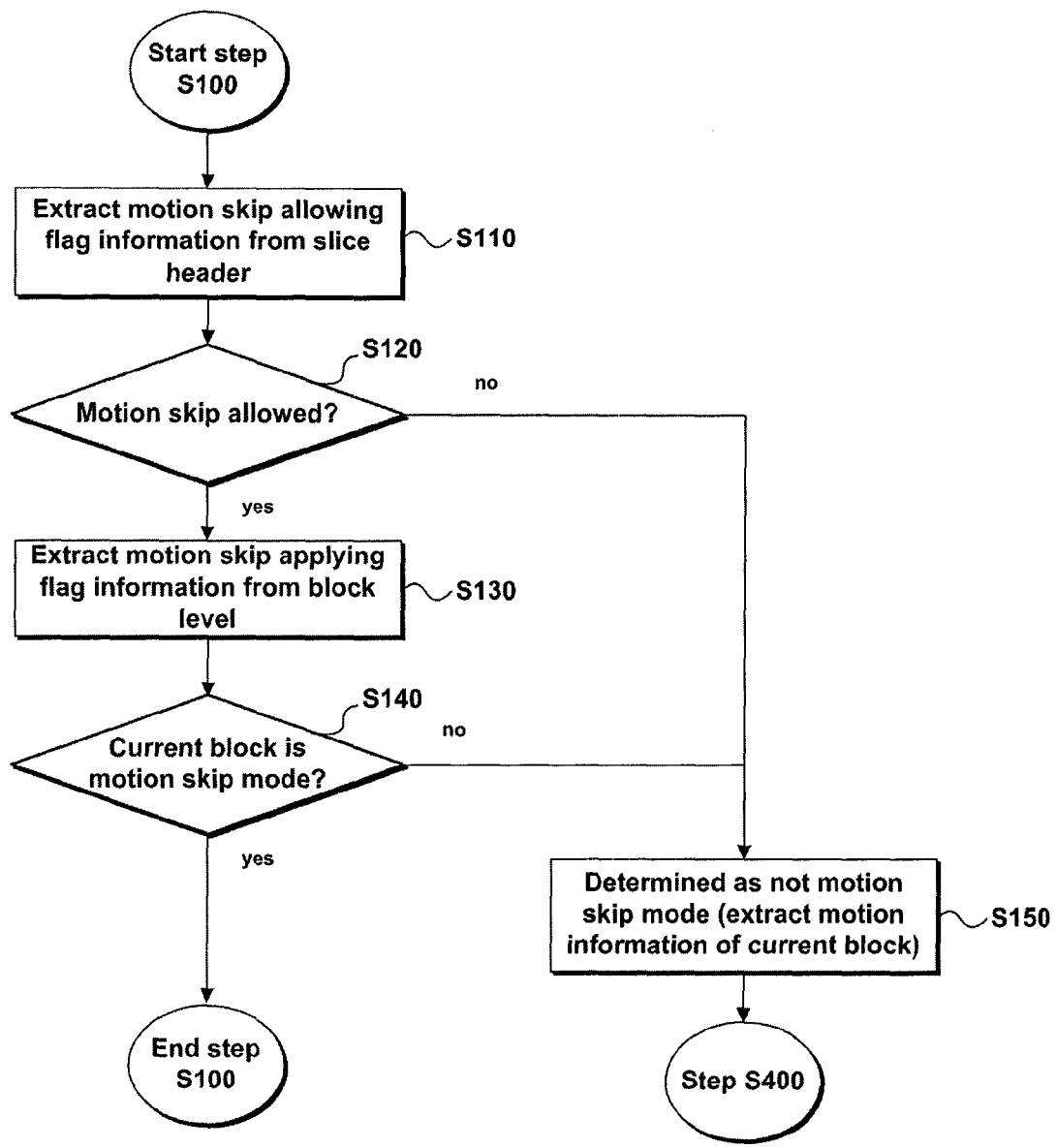
FIG. 4 is a flowchart of an example for sub-steps of a motion skip determining step S100.

Referring to FIG. 4, motion skip allowing flag information is firstly extracted from a slice header [S110]. In this case, the motion skip allowing flag information is the information indicating whether at least one block corresponding to a motion skip mode exists in blocks belonging to a slice. In other words, the motion skip allowing flag information is the information indicating whether a motion skip mode is allowed for blocks within a slice. A motion skip allowing flag can be included in a slice header, which does not put limitation on various implementations of the present invention. An example of syntax, in which a motion skip allowing flag is included in a slice header, is shown in the following table.

TABLE 1

Motion Skip Allowing Flag

| slice_header( ) { |
| first_mb_in_slice |
| slice_type |
| ic_enable |
| motion_skip_enable_flag         (A) |

In Table 1, Referring to a row indicates by (A) marked on a right side thereof, there exists a syntax element 'motion_skip_enable_flag'. This is a motion skip allowing flag and may include a 1-bit flag having a value set to 0 or 1. And, a meaning of each flag value can be defined as the following table.

TABLE 2

Meaning of Motion Skip Allowing Flag

| motion_skip_enable_flag | Meaning |
|---|---|
| 0 | Any block corresponding to motion skip mode does not exist in slice at all. |
| 1 | At least one block corresponding to motion skip mode exists in slice. |

[Modification of Table 1] Motion Skip Allowing Flag

| slice_header( )  { |
| first_mb_in_slice |
| slice_type |
| ic_enable |
| i  = InverseViewID( view_id ) |
| if ( !anchor_pic_flag && |
|   num_non_anchor_ref_l0[i] >0 |
|         ||    num_non_anchor_ref_l1[i]> 0) |
| motion_skip_enable_flag         (A) |

In case that motion skip is not applied to a current slice, it is unnecessary to transfer a motion skip allowing flag. So, as shown in the above table, it is able to add a condition for applying a motion skip. In particular, only if a current slice is a non-anchor picture and it has a reference relation with another view, it is sufficient to transfer a motion skip allowing flag.

Based on the motion skip allowing flag extracted in the step S110, it is decided whether a motion skip mode is allowed for a current slice [S120]. If the motion skip mode is not slowed ['no' in the step S120] (e.g., if a motion skip allowing flag motion_skip_enable_flag is 0), it means that any block corresponding to motion skip mode does not exist in slice at all. Hence, it is decided that a whole corresponding slice does not correspond to the motion skip mode. Motion information on a current block is then extracted at a block level [S150].

Otherwise, if the motion skip is allowed for the current slice in the step S120 ['yes' in the step S120], it is able to execute a step of deciding whether each block within the slice corresponds to the motion skip mode. First of all, motion skip applying flag information is extracted at a block level [S130]. In this case, the motion skip applying flag information is the information indicating whether the current block corresponds to the motion skip mode. An example of extracting a motion skip applying flag from a macroblock layer based on the motion skip allowing flag extracted in the step S110 is shown in the following table.

TABLE 3

Motion Skip Applying Flag

| Macroblock_layer( ) { | |
|---|---|
| if ( ! anchor_pic_flag ) { | |
|   i = InverseViewID( view_id ) | |
|   if( (num_non_anchor_ref_l0[i]  >  0) | (C1) |
|   \|\|( num_non_anchor_ref_l1[i] > 0) && | |
|     motion_skip_enable_flag ) | |
|     motion_skip_flag | (F) |
| } | |
| if (! motion_skip_flag) { | (CC1) |
|   mb_type | (P1) |
| ... | |
|   } else { | (CC2) |
| ... | |
| mb_pred( mb_type ) | (P2) |
| ... | |

Referring to rows having (C1) and (F) marked thereon in a right part of Table 3, if a motion skip allowing flag is not 0 [cf. if ( . . . motion_skip_enable_flag) on the row (C1)], it can be observed that a motion skip applying flag [cf. motion_skip_flag on the row (F)] is extracted. In particular, if the motion skip allowing flag is 0, a motion skip applying flag is not extracted from a macroblock layer.

[Modification of Table 3] Modification Motion Skip Applying Flag

| Macroblock_layer( ) { | |
|---|---|
| if ( motion_skip_enable_flag ) { | (C1) |
|   motion_skip_flag | (F) |
| } | |
| if (! motion_skip_flag) { | (CC1) |
|   mb_type | (P1) |
| ... | |
|   } else { | (CC2) |
| ... | |
| mb_pred( mb_type ) | (P2) |
| ... | |

Like the above [Modification of table 1], if a slice header applies a condition for applying a motion skip to a slice, each macroblock just needs to check a motion skip allowing flag only. So, in case that a motion skip allowing flag, as shown in the above table, in a current slice is 1, it is sufficient to transfer a motion skip applying flag for each macroblock.

Based on the motion skip applying flag extracted in the step S130, it is decided whether a current block corresponds to a motion skip mode [S140]. In this case, a motion skip applying flag may include a 1-bit flag having a value set to 0 or 1 as well. Meaning according to each flag value can be defined as the following table.

TABLE 4

Meaning of Motion Skip Applying Flag

| Motion_skip_flag | Meaning |
|---|---|
| 0 | Current block does not correspond to motion skip mode. |
| 1 | Current block corresponds to motion skip mode. |

As a result of the deciding step S140, if the current block does not correspond to the motion skip mode ['no' in the step S140] (e.g., motion skip applying flag motion_skip_flag is 0), it is determined that it is not the motion skip mode. Motion information on the current block is then extracted from a bitstream [S150] [cf. rows (CC1) and (P1) in Table 3].

Otherwise, if the current block corresponds to the motion skip mode ['yes' in the step S140], the step S100 is terminated and the steps S200 to S400 are then executed.

2.1 Reference List Obtaining Step

As mentioned in the foregoing description, the first and second reference lists are obtained in the step S200 based on the view dependency. The view dependency means relation between a current view and a different view and may relate to whether a different view is necessary to decode a current view. And, the view dependency can be estimated from information contained in a sequence extension field (SPS MVC extension).

The step S200 can be executed based on view dependency (view_dependency) of a non-anchor picture. In this case, an anchor picture is a picture for executing inter-view prediction only, refers to a picture within a different view but does not refer to a picture within the same view. A non-anchor picture is a picture not corresponding to the anchor picture and includes a picture capable of referring to both a picture in a same view and a picture in a different view. The view dependency of the non-anchor picture is the relation between non-anchor pictures of a current view and non-anchor pictures of a different view. Since an anchor picture is characterized in executing inter-view prediction only, a motion skip mode is not applied to the anchor picture. And, the motion skip mode is applicable to a non-anchor picture only. Hence, the step S200 can be executed based on the view dependency of the non-anchor picture.

Meanwhile, view information having view dependency between a current view and a non-anchor picture (non_anchor) can be divided into view information on a first reference list and view information on a second reference list. For instance, the information can be divided into view information (non_anchor_refl0[j][i], j=current view, i=0, . . . , num_anchor_ref_l0−1) on L0-direction reference list and view information (non_anchor_ref_l1[j] [i], j=current view, i= 0, . . . , num_anchor_ref_l1−1) on L1-direction reference list. And, it is able to know a view identifier (view_id) of a different view having view dependency on a current view using the view information.

Figure 5:
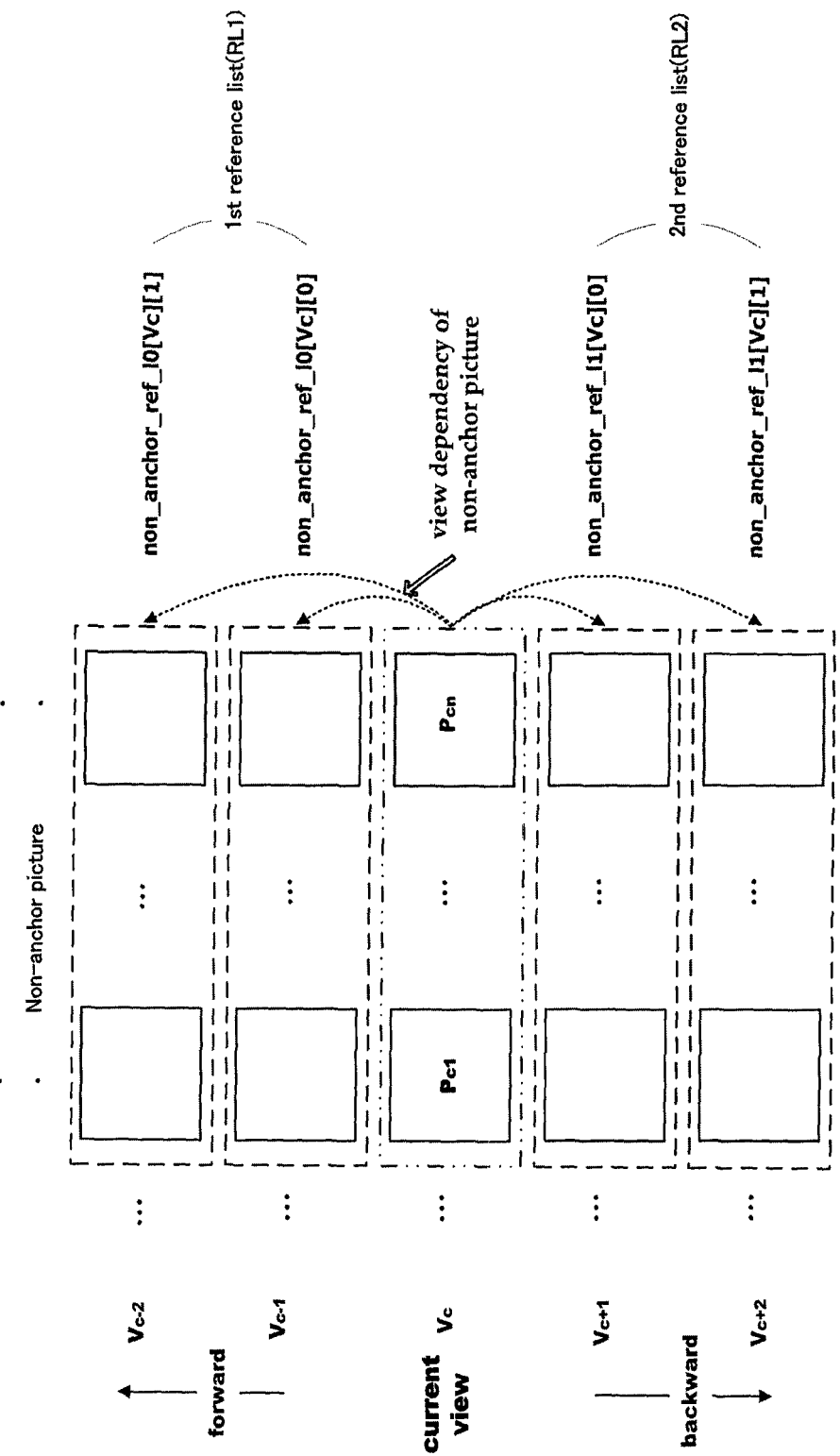
FIG. 5 is a conceptional diagram to explain view dependency and reference list.

FIG. 5 is a conceptional diagram to explain view dependency and reference list. Referring to FIG. 5, there exist non-anchor pictures $P_{c1}, \ldots, P_{cn}$ of a current view $V_c$. A right dotted-line arrow indicates view dependency of a non-anchor picture between the current view $V_c$ and a different view $V_{c−1}$, $V_{c−2}$, $V_{c+1}$ or $V_{c+2}$. It can be observed that views (non_anchor-ref_l0[Vc][i], i=0, 1) having view dependency of the non-anchor picture on the current view $V_c$ in a forward direction are views $V_{c−1}$ and $V_{c−2}$. And, it can be also observed that views (non_anchor-ref_l1[Vc][i], i=0, 1) having view dependency of the non-anchor picture on the current view $V_c$ in a backward direction are views $V_{c+1}$ and $V_{c+2}$. In the case shown in FIG. 5, a first reference view list RL1 conceptionally includes the view $V_{c−1}$ and the view $V_{c−2}$ and a second reference view list RL2 conceptionally includes the view $V_{c+1}$ and the view $V_{c+2}$. This technique is just an embodiment of the case shown in FIG. 5 only. An order of storage in a reference view list is not always defined as order that gets closer to a current view spatially or may be specified by an encoder. A backward view can be contained in the first view list and a forward view can be contained in the second reference view list. Reference picture list reordering (RPLR) operation enables the order to be set different per a slice in a basic list configuration.

A first reference block included in a reference view on a same time reference of a current block may be a reference block associated with inter-motion information and a second reference block included in a current view on a same view reference of a current block may be a reference block associated with intra-motion information.

Thus, after the first and second reference view lists have been obtained, a reference view is decided in the step S300 using the obtained first and second reference view lists.

2.2 Offset Obtaining Step

To search for a corresponding block in the step S300, an offset value between a current block and a corresponding block of a reference picture is needed. The offset value can be derived in various ways a) zero vector, b) global motion vector, c) local motion vector, etc. And, a corresponding block can be searched for in various ways using the offset value as well. Various embodiments thereof are explained as follows.

2.2.1 Offset Type and Driving Method Thereof (1) Zero Vector

It is able to set a zero vector to an offset between a current block and a corresponding block. This corresponds to a case that the corresponding block is set to a co-located block.

(2) Global Motion Vector

Global motion vector or global disparity vector is a value that represents a difference of overall motion or disparity between a current picture and a reference picture and may include an offset corresponding to a slice, a field, a frame, a sequence or the like as well as a picture. If a motion skip mode is to skip motion information in a time direction, a global motion vector becomes a difference of motion or disparity in a view direction. On the contrary, if a motion skip mode is to skip motion information in a view direction, a global motion vector becomes a difference of motion or disparity in a time direction.

It is able to transfer a global motion vector in various ways. The global motion vector can be transferred for each picture or for each anchor picture. And, it is also able to transfer one global motion vector for a whole sequence. In case that a global motion vector is transferred for each anchor, since a motion skip mode is applicable to a non-anchor picture only, it is able to transfer a global motion vector for a view having view dependency of a non-anchor picture only. For instance, if a view identifier of a current view is $V_c$, if a view having view dependency between non-anchor pictures is $V_{c-1}$ in a direction L0, and if a view having view dependency between non-anchor pictures is $V_{c+2}$ in a direction L1, a global motion vector global_disparity_l0[0] (where, ViewID[0]=$V_{c-1}$) can be transferred in the direction L0 and a global motion vector global_disparity_l1[1] (where, ViewID[1]=$V_{c+2}$) can be transferred in the direction L1.

Thus, in case that a global motion vector is transferred for each anchor picture, it is able to derive a global motion vector of a non-anchor picture using a global motion vector of a neighbor anchor picture. This can be accomplished in various ways. In case that a current picture is a non-anchor picture, it is able to bring one of global motion vectors of a most nearest neighbor anchor picture as it is. Alternatively, it is able to find a global motion vector by performing interpolation on global motion vectors of two neighbor anchor pictures by considering POC (picture order count) between the current picture and a neighbor anchor picture. And, the present invention enables more implementations thereof.

Resolution of a global motion vector can have resolution of macroblock, 8×8 block, 4×4 block, pixel, subpixel or the like. A reference picture is decided by 8×8 block unit and a motion vector is decided by 4×4 block unit. So, in case that a global motion vector is found by 8×8 block level unit, it is able to specify a more detailed corresponding block than that found by macroblock level unit.

(3) Local Motion Vector

Local motion vector normally has resolution of ¼ pel not as an offset corresponding a whole picture but as an offset corresponding to a specific macroblock, a specific 8×8 block or a specific 4×4 block within a picture. In case that neighbor vectors adjacent to a current block have motion vectors (or disparity vectors) in a view direction, it is able to derive a location motion vector of the current block using the motion vectors of the neighbor blocks. In particular, based on whether the neighbor blocks have a same reference picture of the current block, it is able to use motion vectors of the neighbor blocks having the same reference picture of the current picture. Alternatively, by checking whether the reference picture is identical in accordance with a priority by giving the priority to a specific block (e.g., first priority given to a left upper block, second priority to an upper block, etc.), it is able to use the motion vector of the neighbor block having the same reference picture.

2.2.2 Offset Refinement Method

The zero or view-directional motion vector (global motion vector or local motion vector) derived in Clause 2.2.1 may differ from a real motion vector of a current block in a view direction. If the difference is transferred as the following table, a prediction value is set to a value of a derived motion vector and it is then able to obtain a motion vector by adding the difference value to the prediction value.

TABLE 5

Transfer Difference (Offset) from Prediction of Motion Vector

| Macroblock_layer( ) { |  |
| --- | --- |
| ... |  |
| if(motion_skip_flag) { | (C3) |
| For( compIdx = 0; compIdx < 2; compIdx++ ) |  |
| matching_block_offset[compIdx] | (P3) |
| ... |  |

It is understood that the difference value can be a value of macroblock (16×16) level, 8×8 block level, 4×4 block level, pixel level or subpixel unit.

Thus, it is able to find an offset between a current block and a corresponding block according to various embodiments.

3. Reference View and Corresponding Block Deciding Step

Using the reference list and offset obtained in the above process, it is able to decide a reference view and a corresponding block existing in the reference view. In case that motion information exists in a corresponding block of a view, the view becomes a final reference view of a current block and the corresponding block becomes a final corresponding block. Meanwhile, a corresponding block may belong to a picture on a same time zone. If a corresponding block belongs to a picture on a different time instance, it is able to further use POC (picture order count) information.

The information on the reference view can be transferred via a bitstream by an encoder, which is an explicit scheme. The information on the reference view can be arbitrarily decided by a decoder, which is an implicit scheme. The explicit and implicit schemes will be explained in the following description.

Besides, in mapping a current block and a corresponding block to each other, there can exist various embodiments for varying such a level as a macroblock level, an 8×8 block level and the like. This will be explained in the following description as well.

3.1 Scheme for Deciding Reference View and Corresponding Block (1) Explicit Scheme First of all, it is able to explicitly transfer information indicating which one of views contained in first and second reference lists will be set as a reference view, i.e., a view identifier of a reference view.

Moreover, in case that it is set to check whether a view nearest to a current view among views belonging to each reference list can be set as a reference view, it is unnecessary to explicitly transfer a view identifier of the reference view. Yet, since both of the first and second reference lists can exist in such a case, it is able to explicitly transfer a motion skip reference list flag, which indicates which one of the two will be firstly checked, as shown in the following table.

TABLE 6

Reference View Information Transfer

```
macroblock_layer( ) {
    ...
    if(motion_skip_flag) {
        If(num_non_anchor_refs_l0[view_id]
            >0&&
            num_non_anchor_refs_l1[view_id]>0
            )
            motion_skip_ref_list_flag
    ...
```

[Modification of Table 6] Reference View Information Transfer

```
macroblock_layer( ) {
    ...
    if(motion_skip_flag) {
        motion_skip_ref_list_flag
    ...
```

Like [Modification of Table 1], in case that a motion skip allowing condition is applied to a slice header, it sufficient to confirm motion skip flag information only like the above table.

TABLE 7

Meaning of Motion Skip Reference List Flag

| motion_skip_ref_list_flag | Meaning |
| --- | --- |
| 0 | Check which one of reference views belonging to a first reference list can become a reference view. |
| 1 | Check which one of reference views belonging to a second reference list can become a reference view. |

(2) Implicit Scheme

First of all, information indicating which one of views contained in first and second reference lists will be set as a reference view may not be transferred. In this case, it is able to decide a final reference view and a final corresponding block by checking whether motion formation exists in a corresponding block of each of the reference views. And, various embodiments can exist for whether to firstly check a reference view belonging to which one of the first and second reference lists. Moreover, various embodiments can exist for, if motion information does not exist in the corresponding reference view, how to continue performing a check in prescribed order.

In priorities between reference views belonging to a reference list, first of all, it is able to check reference views included in the first or second reference list in order of a lower index indicating a reference view. In this case, the index indicating the reference view may include a serial number of each reference view set in coding a bitstream by an encoder. For instance, in case of representing a reference view of a non-anchor picture in sequence extension information (SPS extension) as non_anchor_ref_l0[i] or non_anchor_ref_l1[i], 'i' may be the index indicating the reference view. The encoder is able to give a lower index in order closer to a current view, which does not restrict various implementations of the present invention. In case that an index 'i' starts from 0, a reference view of i=0 is checked, a reference view of i=1 is checked, and a reference view of i=2 is then checked.

Secondly, it is able to check reference views in order closer to a current view among reference views included in the first or second reference list.

Thirdly, it is able to check reference views in order closer to a base view among reference views included in the first or second reference list.

In priorities between the first and second reference lists, it is able to set reference views belonging to the first reference list to be checked prior to reference views belonging to the second reference list. On the assumption of the above setting, explained in the following description are a case that reference views exist in both of the first and second reference lists and a case that a reference list exists in either the first or second reference list.

(2)-1 Case that Reference Views Exist in Both of Two Reference Lists

Figure 6:
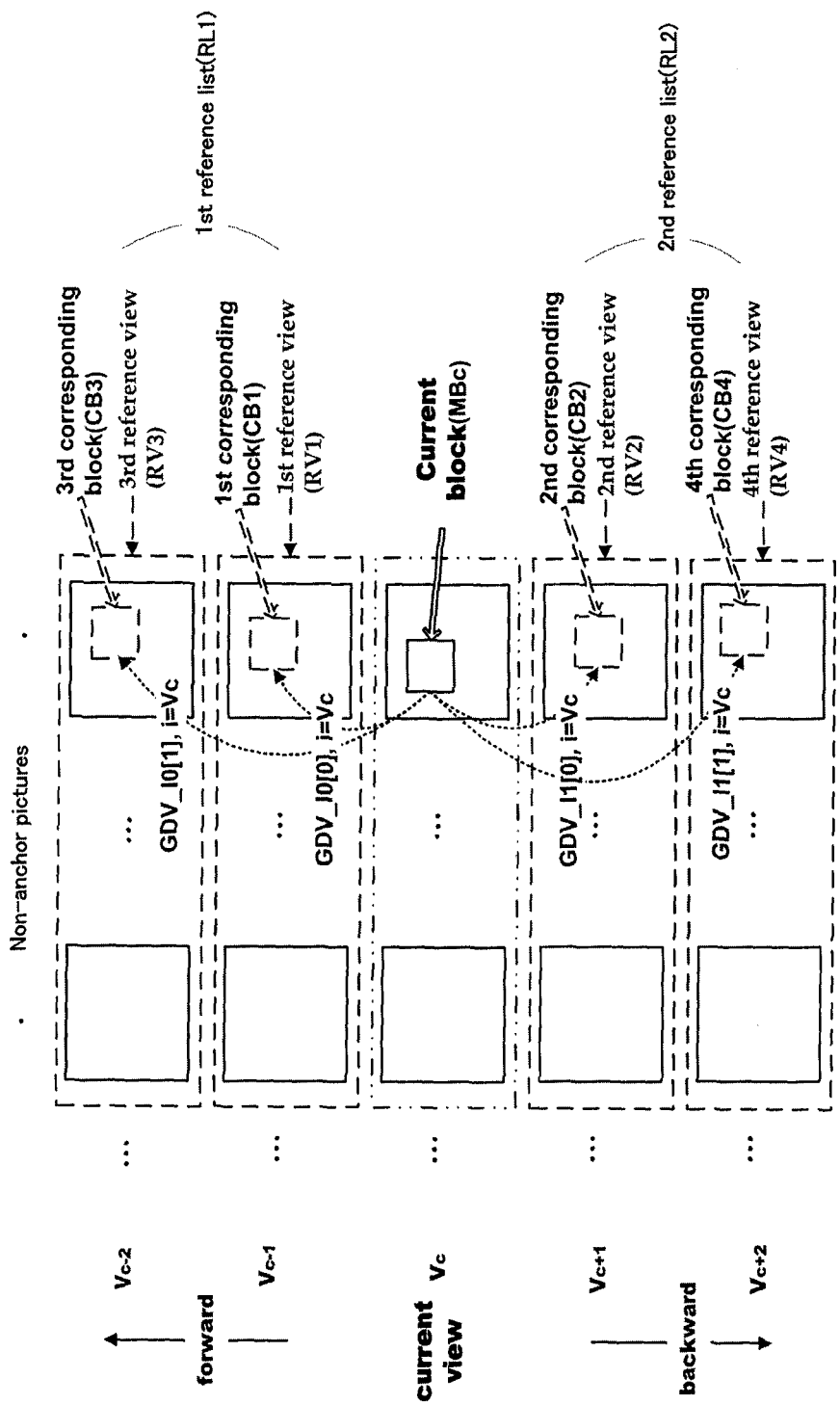
FIG. 6 is a diagram for one example of a reference list for a current view.
Figure 7:
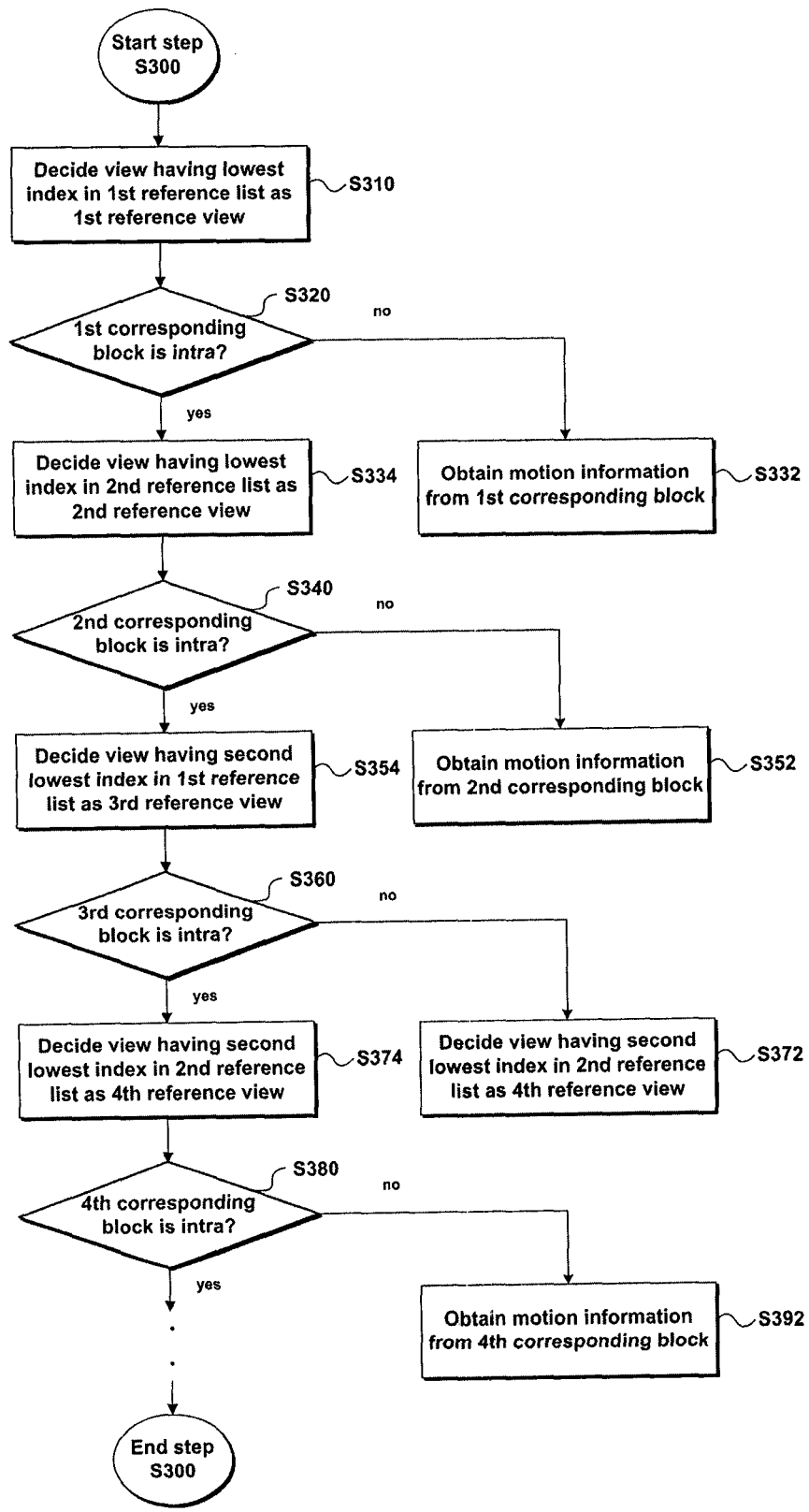
FIG. 7 is a flowchart of one example for sub-steps of a step S300 of determining a reference view and a corresponding block.

FIG. 6 is a diagram for one example of a reference list for a current view, and FIG. 7 is a flowchart of one example for sub-steps of a step S300 of deciding a reference view and a corresponding block. Referring to FIG. 6, it can be observed that there exist a first reference list RL1 in a direction L0 and a second reference list RL2 in a direction L1 with reference to a current view $V_c$ and a current block $MB_c$.

Referring to FIG. 6 and FIG. 7, a view ($V_{c-1}$=non_anchor_ref_l0[0]) having a lowest index indicating a reference view in the first reference list RL1 is decided as a first reference view RV1 and a block indicated by an offset (GDV_l0[0]) between the current view $V_c$ and the first reference view RV1 is decided as a first corresponding block CB1 [S310]. If the first corresponding block CB1 is not an intra block, i.e., if motion information exists ['no' in the step S320], the first corresponding block is finally decided as a corresponding block and then motion information is obtained from the first corresponding block [S332].

On the other hand, in case that a block type of the corresponding block CB1 is an intra-frame prediction block ['yes' in the step S320], a view ($V_{c+1}$=non_anchor_ref_l1[0]) having a lowest index in the second reference list RL2 is decided as a second reference view RV2, and a block indicates by an offset (GDV_l1[0]) between the current view $V_c$ and the second reference view RV2 is decided as a second corresponding block CB2 [S334]. Subsequently, like the formerly described steps S320, S332 and S334, if motion information fails to exist in the second corresponding block CB2, a view ($V_{c-2}$=non_anchor_ref_l0[1]) having a second lowest index in the first reference list is decided as a third reference view RV3 and a view ($V_{c+2}$=non_anchor_ref_l1[1]) having a second lowest index in the second reference list is decided as a fourth reference view RV4. Thus, third and fourth corresponding blocks CB3 and CB4 are sequentially checked. In particular, by considering an index indicating a reference view, a presence or non-presence of motion information is checked in a manner of alternating the reference views of the first and second reference lists RL1 and RL2.

If a view (e.g., non_anchor_ref_l0[i], non_anchor_ref_l1[i], i=0) having a lowest index in view dependency information on a current view is a view closest to the current view $V_c$, a selection reference for candidates (i.e., the first reference view, the second reference view, etc.) of a reference view may follow an order that is closest to the current view $V_c$. Meanwhile, if a view having a lowest index is a view close to a base view, a candidate selection reference can be the base view or an order that is closest to the base view, which does not restrict various implementations of the present invention.

(2)-2 Case that Reference View Exists in Single Reference List

Figure 8:
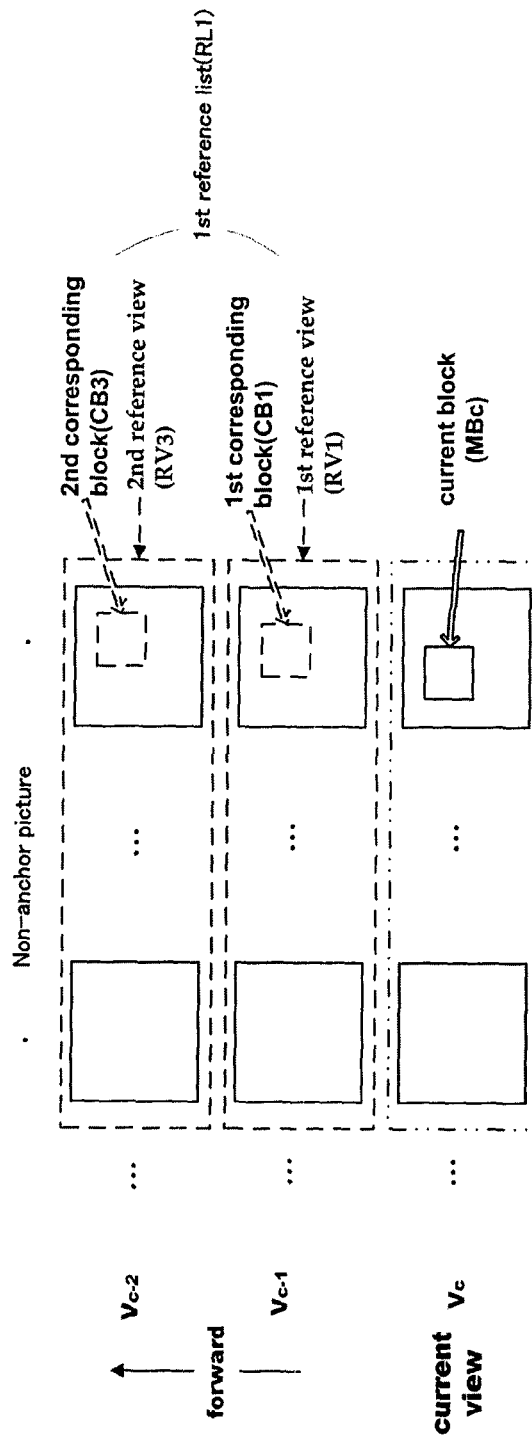
FIG. 8 is a diagram for another example of a reference list for a current view.
Figure 9:
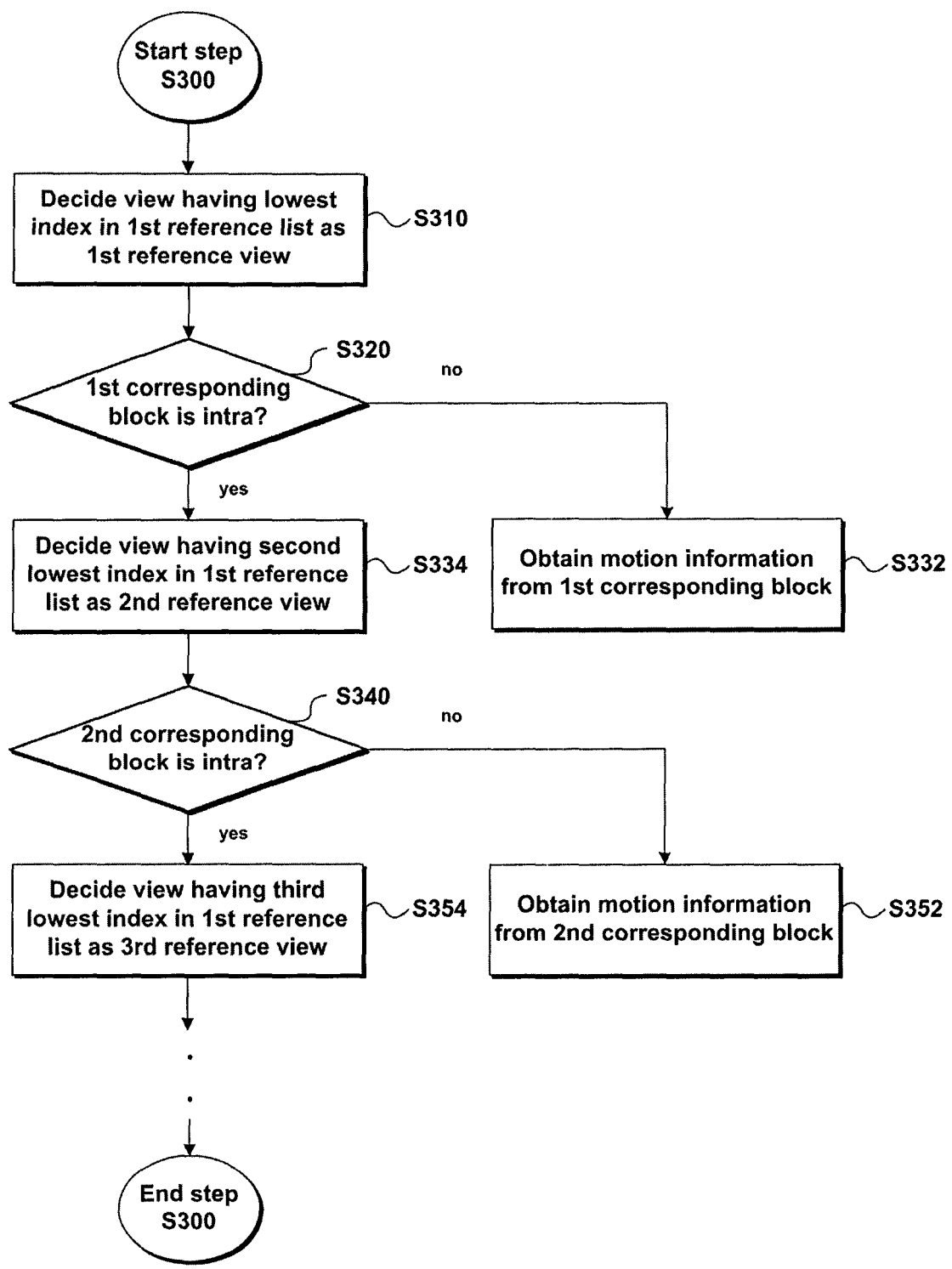
FIG. 9 is a flowchart of another example for sub-steps of a step S300 of determining a reference view and a corresponding block.

FIG. 8 is a diagram for another example of a reference list for a current view, and FIG. 9 is a flowchart of another example for sub-steps of a step S300 of determining a reference view and a corresponding block. FIG. 8 and FIG. 9 show a first reference list RL1 only. In this case, a view ($V_{c-1}$=non_anchor_ref_l0[0]) having a lowest index in the first reference list RL1 is decided as a first reference view RV1 and a first corresponding block CB1, a view ($V_{c-2}$=non_anchor_ref_l0[1]) having a second lowest index is decided as a second reference view RV2 and a second corresponding block CB2, a view having a third lowest index is decided as a third reference view (RV3=non_anchor_ref_l0[2]) (not shown in the drawing) and a third corresponding block CB3 (not shown in the drawing). IT is then checked whether a type of each of the corresponding blocks is an intra block or not. Thus, a reference view and a corresponding block capable of using motion information are finally decided.

Figure 10:
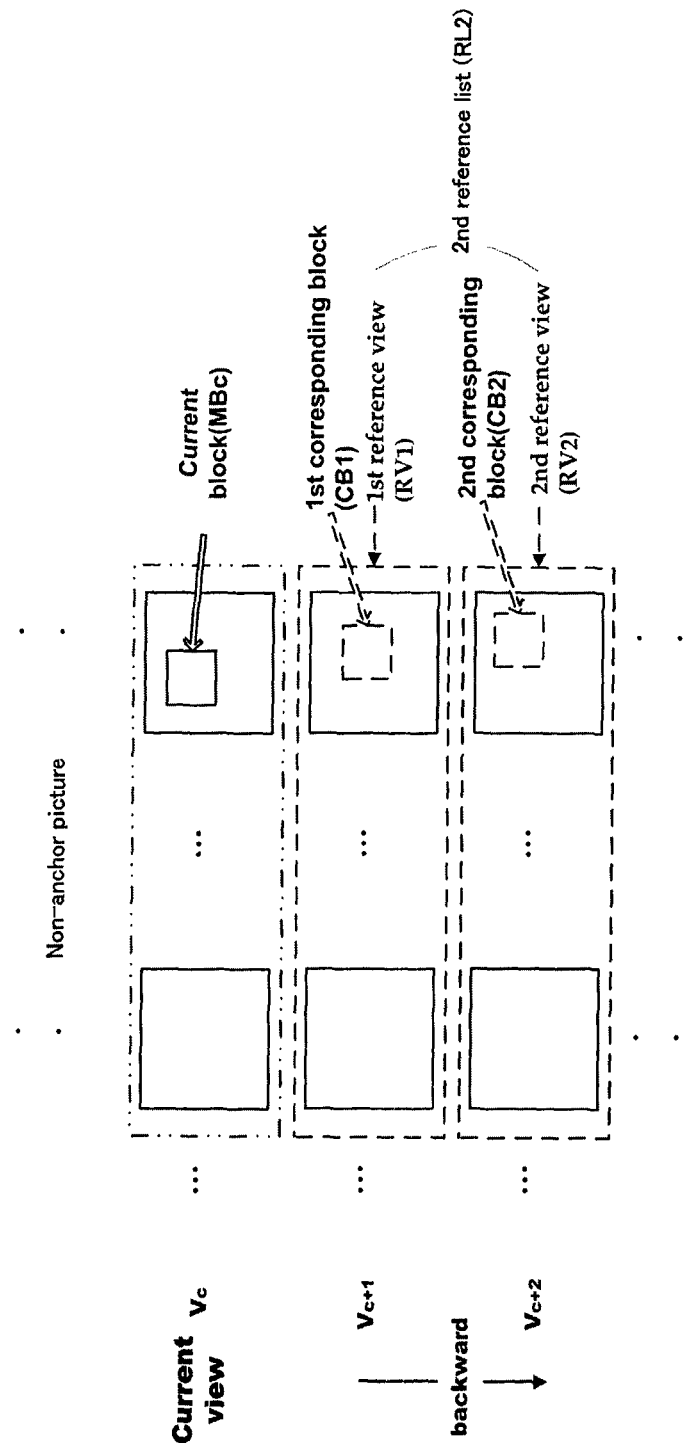
FIG. 10 is a diagram for a further example of a reference list for a current view.
Figure 11:
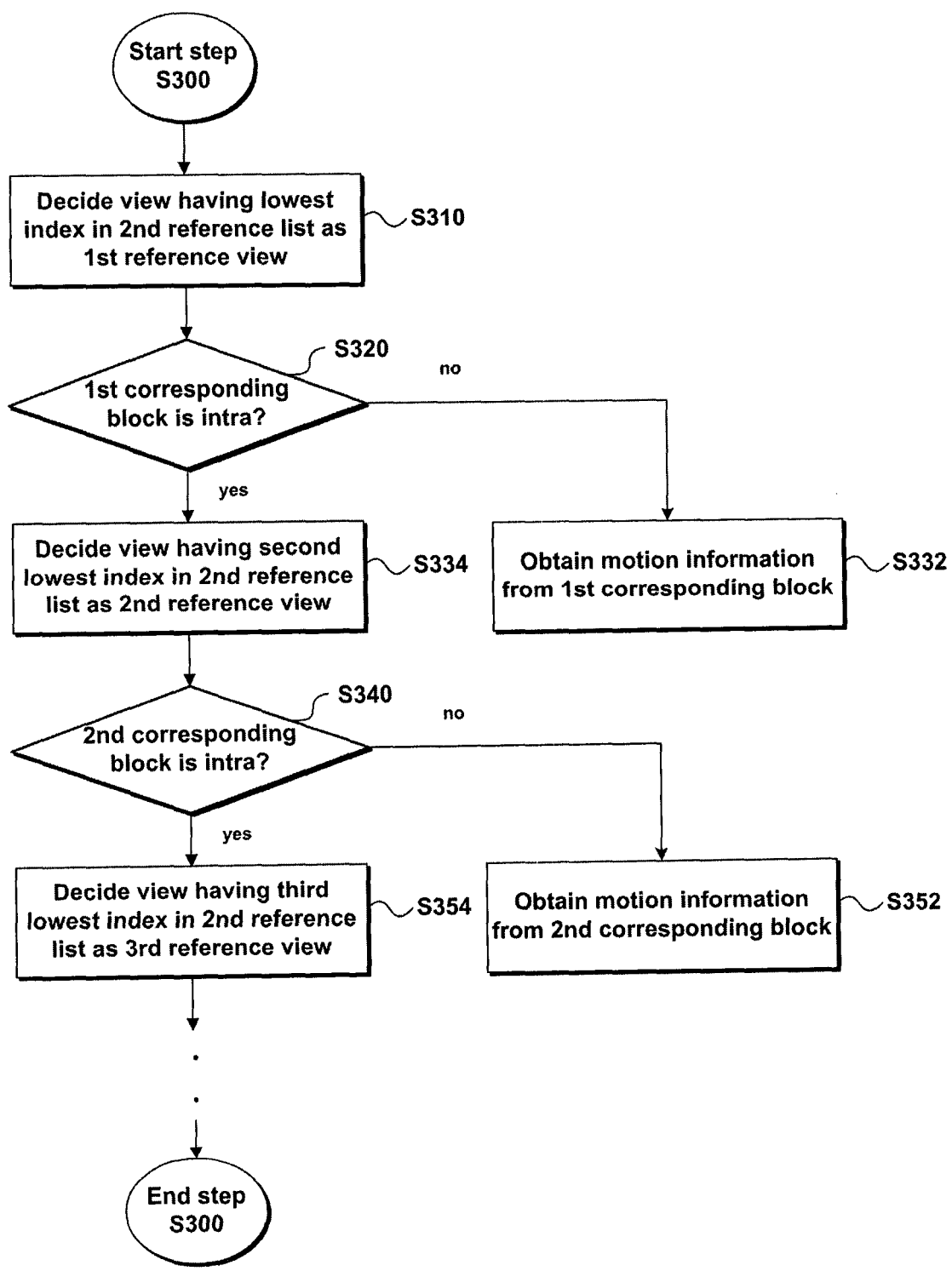
FIG. 11 is a flowchart of a further example for sub-steps of a step S300 of determining a reference view and a corresponding block.

FIG. 10 is a diagram for a further example of a reference list for a current view, and FIG. 11 is a flowchart of a further example for sub-steps of a step S300 of determining a reference view and a corresponding block. FIG. 10 and FIG. 11 show a second reference list RL2 only. Similar to the case shown in FIG. 8 and FIG. 9, first reference view RV1 and first corresponding block CB1, second reference view RV2 and second corresponding block CB2, third reference view RV3 and third corresponding block CB3 and the like are decided in order of a lower index in the second reference list RL2. It is then checked whether a type of each of the corresponding blocks is an intra block in corresponding order. In other words, if a reference view does not exist in the first reference list RL1, a reference view in a direction L0 is not tested and block types of the corresponding blocks are checked in order from a view having a lower index among the reference views of the second reference list RL2.

Through the above process, a reference view and a corresponding block to obtain motion information in the step S300 are decided.

3.2 Corresponding Block According to Each Mapping Level

To search for a corresponding block in a reference view, it is able to use a local motion vector corresponding to a macroblock (16×16 block), 8×8 block, 4×4 block, pixel, subpixel or the like as well as a global motion vector. Meanwhile, a unit of a global or local motion vector can be a unit of a macroblock (16×16 block), 8×8 block, 4×4 block, pixel, subpixel or the like.

Figure 12:
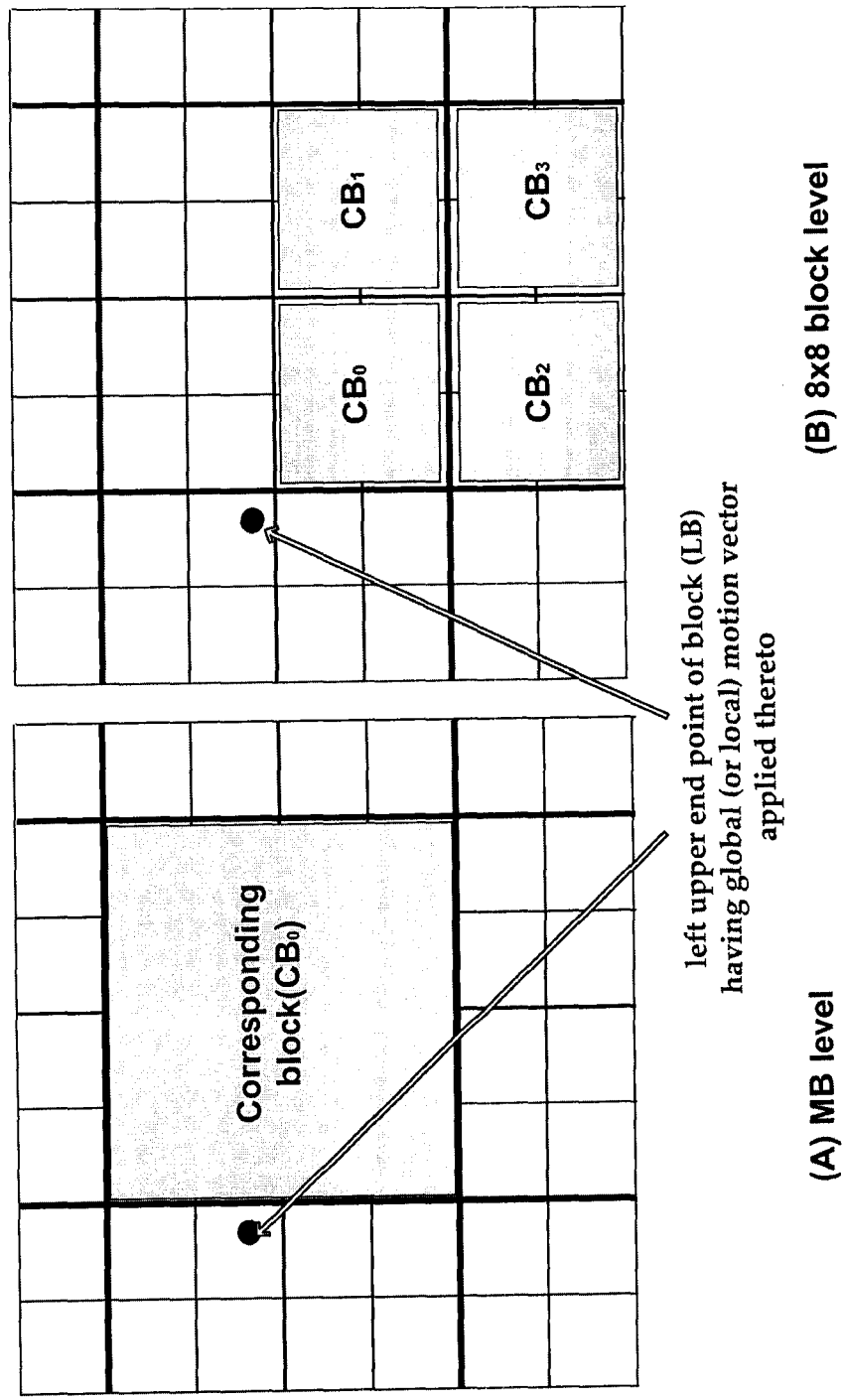
FIG. 12 is a diagram to explain a case that a mapping level is a macroblock level or 8×8 block level.
Figure 13:
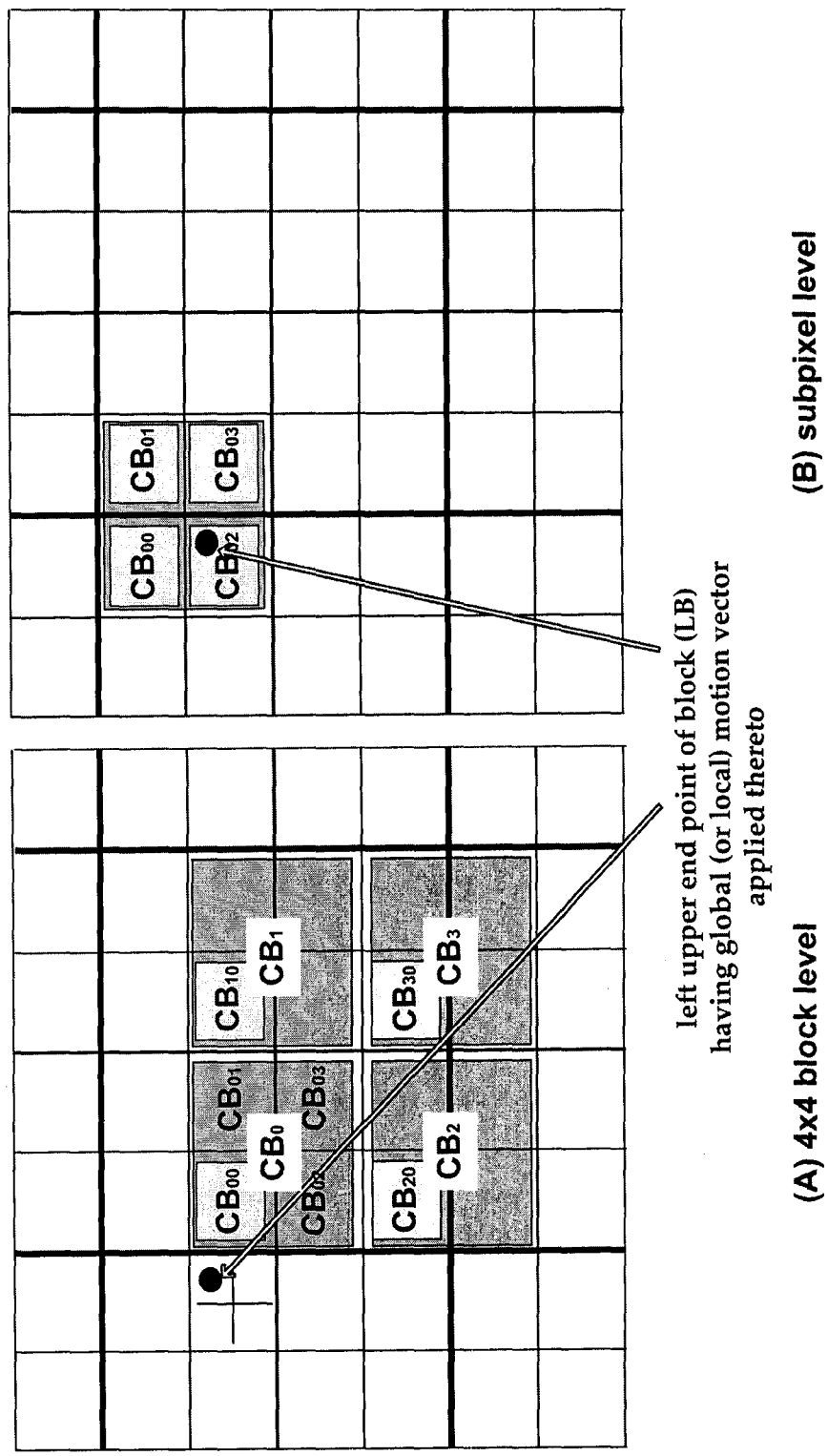
FIG. 13 is a diagram to explain a case that a mapping level is an 8×8 block level or a sub-pixel level.

In mapping a current block and a corresponding block using the global or local motion vector, various levels can be provided. FIG. 12 is a diagram to explain a case that a mapping level is a macroblock level or 8×8 block level, and FIG. 13 is a diagram to explain a case that a mapping level is an 8×8 block level or a sub-pixel level. A method of deciding a corresponding block in each case is explained as follows.

(1) Macroblock Level

Referring to (A) of FIG. 12, a left upper end point of a block LB having a global or local motion vector applied thereto is marked. It is able to decide a macroblock $CB_0$ closest to the block LB having the global or local motion vector applied thereto as a corresponding block. In particular, all motion information on a corresponding block such as block type information, a reference picture index, a motion vector and the like can be used as motion information on a current block as it is. Yet, in case that a corresponding block is such a skip block as P skip (P_skip) and B skip (B_skip), it can be reset to an inter 8×8 mode.

(2) 8×8 Block Level

Referring to (B) of FIG. 12, 8×8 block $CB_0$ closest to a block LB having a global or local motion vector applied thereto and 8×8 blocks $CB_1$, $CB_2$ and $CB_3$ neighbor to the block are shown. Using the four 8×8 blocks as corresponding blocks, it is able to use motion informations of the blocks for decoding of a current block. If each of the four blocks has motion information as an inter block, a type of the current block is decided as 'inter 8×8'. If the current block is a macroblock (16×16), it is divided into four 8×8 blocks ($MBc_0$, $MBc_1$, $MBc_2$, $MBc_3$) (not shown in the drawing). Motion information on a corresponding block corresponding to each of the 8×8 blocks is then used. For instance, in case that the current block is $MBc_2$, motion information on a corresponding block $CB_2$ is used. On the other hand, in case that there exists an intra block in four corresponding blocks, it is able to use motion information corresponding to a different inter block.

(3) 4×4 Block Level

Referring to (A) of FIG. 13, 4×4 block $CB_0$ closest to a block LB having a global or local motion vector applied thereto, 8×8 block including the 4×4 block $CB_0$ and 8×8 blocks $CB_1$, $CB_2$ and $CB_3$ neighbor to the 8×8 block are shown. Various embodiments can exist as a method of using motion information on these blocks. And, it is able to use motion vector and reference picture index information on a block $CB_{00}$ closest to the block LB as they are. Alternatively, a reference picture index is derived using index information on a reference picture of the 8×8 block including the 4×4 block $CB_{00}$ and a motion vector is derived by taking an intermediate or average value of motion vectors of the 4×4 block $CB_{00}$ and reference blocks $CB_{10}$, $CB_{20}$ and $CB_{30}$.

Alternatively, it is able to it is able to map motion information on 4×4 blocks $CB_{00}$, $CB_{10}$, $CB_{20}$ and $CB_{30}$ to each of the 8×8 blocks of the current block. Alternatively, a smallest value of reference picture indexes of three 4×4 blocks $CB_{00}$, $CB_{10}$ and $CB_{20}$ is decided as a reference picture index of the current block and a motion vector of the current block is then derived using motion vectors of the three 4×4 blocks. If motion information on the three 4×4 blocks is unusable, it is able to motion information on the 4×4 block $CB_{30}$ at a right lower end. And, it is able to set a type of macroblock to 'inter_8×8 mode'.

(4) Pixel/Subpixel Level

Referring to (B) of FIG. 13, 4×4 block closest to a block LB having a global or local motion vector applied thereto and its neighbor blocks $CB_{00}$, $CB_{01}$, $CB_{02}$ and $CB_{03}$ are shown. A reference picture index and a motion vector of the closest 4×4 block are usable as they are or can be derived from reference picture indexes and motion vectors of four 4×4 blocks. In deriving a motion vector, a method of an intermediate or average is usable. And, it is able to set a type of macroblock to 'inter_8×8 mode'.

In the above-explained levels of the four kinds of cases, each of the per-level mapping methods is independently usable or any combinations thereof are possible. Meanwhile, in case that an initial mapping position is located at a special point such as a corner, an edge, a block center and the like, exceptional processing is necessary. And, such order as left side, right side, upper side, lower side, left upper side, right upper side, left lower side, right lower side and the like can be arbitrarily designated. Besides, processing needs to be performed on an intra block or an exception that a reference index fails to exist on a same view.

4. Step of Decoding Current Block Using Motion Information on Corresponding Block After the reference view and corresponding block have been decided to obtain motion information in the step S300, motion information on a current block is derived using motion information on the corresponding block in the step S400. In case that there exist various corresponding blocks of 16×16 level, 8×8 level and the like, as mentioned in the foregoing description of '3.2 Corresponding block According to Each Mapping Level', there can exist various embodiments. Meanwhile, there can exist a method of deriving residual information and the like as well as motion information on a corresponding block. To raise accuracy of motion information, there can exist a method of transferring a difference between a motion vector value derived by a motion skip scheme and a real value. Theses methods are explained as follows.

4.1 Residual Deriving Method

First of all, a residual of a corresponding block is usable as a residual of a current block as well as motion information on the corresponding block. In particular, a prediction value of a current block is obtained using a reference picture index and motion vector obtained in accordance with a process for a motion skip mode. The current block is then reconstructed by adding the residual of the corresponding block to the obtained prediction value.

4.2 Motion Vector Refinement Method

The motion vector obtained in accordance with the process for the motion skip mode may have a difference from a real motion vector of the current block. If the difference value is transferred via a bitstream, it is able to obtain a more accurate motion vector by adding the difference value to the motion vector derived in accordance with the motion skip mode in the course of decoding. By performing motion compensation using the obtained motion vector, it is able to raise a reconstruction rate of the current block.

4.3 Residual Skip Method

In case that similarity between motion information on a current block and motion information on a corresponding block is considerably high and if a reconstruction rate after completion of motion compensation of the current block is considerably high, a residual of the current block may almost 0. In this case, its able to reduce bits rate required for residual coding by not transferring a residual value at all. In case that a residual value is not included in a bitstream, flag information (e.g., residual_coding_flag) indicating whether residual data is transferred can be included in the bitstream. In particular, if the flag information is 0, residual decoding is not performed as well as residual data is not extracted. If the flag information is 1, residual data is extracted and the extracted residual data is then added to a prediction value of a current block.

Moreover, the encoding/decoding method of the present invention can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, a bitstream produced by the encoding method is stored in a computer-readable recording medium or can be transmitted via wire/wireless communication network.

INDUSTRIAL APPLICABILITY

Accordingly, the present invention is applicable to encoding/decoding a video signal.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of processing a video signal with a decoding apparatus, comprising:
   obtaining, with the decoding apparatus, a global disparity vector of a current slice in a current view, the global disparity vector of the current slice being derived from a global disparity vector of an anchor picture, the anchor picture being a coded picture in which all slices reference only slices corresponding to a same time and a different view of the anchor picture;
   extracting, with the decoding apparatus, a motion skip flag from the video signal, the motion skip flag indicating whether motion information of a current block in the current view is derived from a reference block in a neighboring view, the reference block included in an inter-view reference picture of a reference picture list;
   extracting, with the decoding apparatus, offset refinement information of the current block based on the motion skip flag, the offset refinement information being an offset vector between a corresponding block indicated by the global disparity vector of the current slice and the reference block, the corresponding block being in the neighboring view, the corresponding block included in the inter-view reference picture of the reference picture list;
   obtaining, with the decoding apparatus, a refined global disparity vector of the current block using the global disparity vector of the current block and the offset refinement information;
   determining, with the decoding apparatus, the reference block for the current block using the refined global disparity vector;
   deriving, with the decoding apparatus, the motion information of the current block from the determined reference block; and
   decoding, with the decoding apparatus, the current block using the motion information of the current block.

2. The method of claim 1, wherein the reference picture list includes at least one of a forward reference list and a backward reference list.

3. The method of claim 1, wherein the reference picture list is obtained based on view dependency information, the view dependency information including a view identifier of a reference view for the current slice.

4. The method of claim 3, wherein the view dependency information is obtained from a sequence header.

5. The method of claim 1, wherein the motion information includes a motion vector and a reference picture index.

6. An apparatus for processing a video signal, comprising:

a decoding apparatus configured to, obtain a global disparity vector of a current slice in a current view, the global disparity vector of the current slice being derived from a global disparity vector of an anchor picture, the anchor picture being a coded picture in which all slices reference only slices corresponding to a same time and a different view of the anchor picture, extract motion skip flag from the video signal, the motion skip flag indicating whether motion information of a current block in the current view is derived from a reference block in a neighboring view, the reference block including in an inter-view reference picture of a reference picture list, extract offset refinement information of the current block based on the motion skip flag, the offset refinement information being an offset vector between a corresponding block indicated by the global disparity vector of the current slice and the reference block, the corresponding block being in the neighboring view, the corresponding block including in the inter-view reference picture of the reference picture list, configured to obtain a refined global disparity vector of the current block using the global disparity vector of the current block and the offset refinement information, determine the reference block for the current block using the refined global disparity vector, derive the motion information of the current block from the determined reference block, and decode the current block using the motion information of the current block.

\* \* \* \* \*